United States Patent
Kazar

(10) Patent No.: US 7,127,565 B2
(45) Date of Patent: Oct. 24, 2006

(54) METHOD AND SYSTEM FOR SAFELY ARBITRATING DISK DRIVE OWNERSHIP USING A TIMESTAMP VOTING ALGORITHM

(75) Inventor: Michael Leon Kazar, Pittsburgh, PA (US)

(73) Assignee: Spinnaker Networks, Inc., Pittsburgh, PA (US)

( * ) Notice: Subject to any disclaimer, the term of this patent is extended or adjusted under 35 U.S.C. 154(b) by 385 days.

(21) Appl. No.: 09/932,896

(22) Filed: Aug. 20, 2001

(65) Prior Publication Data

US 2003/0041287 A1 Feb. 27, 2003

(51) Int. Cl.
*G06F 12/00* (2006.01)
*G06F 15/177* (2006.01)

(52) U.S. Cl. .................. 711/152; 711/163; 711/148; 709/221; 709/224; 709/225; 709/229

(58) Field of Classification Search ............... 709/229, 709/223–226, 208, 209, 220, 213, 216, 221; 711/111, 112, 163, 148, 152; 714/4, 11, 12
See application file for complete search history.

(56) References Cited

U.S. PATENT DOCUMENTS

| | | | |
|---|---|---|---|
| 6,226,717 B1 * | 5/2001 | Reuter et al. ............... | 711/147 |
| 6,363,416 B1 * | 3/2002 | Naeimi et al. .............. | 709/209 |
| 6,463,532 B1 * | 10/2002 | Reuter et al. ............... | 709/224 |
| 6,662,219 B1 * | 12/2003 | Nishanov et al. ........... | 709/220 |
| 6,748,438 B1 * | 6/2004 | Palmer et al. .............. | 709/229 |
| 6,871,222 B1 * | 3/2005 | Frank et al. ................ | 709/223 |
| 2002/0161889 A1 * | 10/2002 | Gamache et al. ........... | 709/226 |
| 2003/0046369 A1 * | 3/2003 | Sim et al. ................... | 709/220 |
| 2004/0139167 A1 | 7/2004 | Edsall et al. | |
| 2005/0262143 A1 * | 11/2005 | Rao et al. ................. | 707/104.1 |

OTHER PUBLICATIONS

"Supervisor Recovery in Ring Networks," Goyal, A. and Nelson, R., IBM Technical Disclosure Bulletin vol. 5 No. 8, 1985, pp. 4715-4717.*

* cited by examiner

*Primary Examiner*—Matthew Kim
*Assistant Examiner*—Shane M. Thomas
(74) *Attorney, Agent, or Firm*—Ansel M. Schwartz

(57) ABSTRACT

In data storage system including multiple servers and multiple disks, and wherein each server is in communication with each disk, each disk has a reserved disk block for each of the servers. The system includes a disk arbitration mechanism that uses a timestamp-based voting algorithm over the disk blocks associated with the servers to exchange votes for a primary server to arbitrate access of the servers to a set of disks. The disk arbitration mechanism further includes each server writing its state in its own associated disk block in each disk, and reading all the other servers' disk blocks in each disk in order to determine which server has access to, use, and control of the disks at a given time.

34 Claims, 3 Drawing Sheets

METHOD AND SYSTEM FOR SAFELY ARBITRATING DISK DRIVE OWNERSHIP USING A TIMESTAMP VOTING ALGORITHM

FIELD OF THE INVENTION

The present invention is related to a data storage system. More specifically, the present invention pertains to a data storage system with D disks, where each disk has a reserved disk block for each of N servers that uses a timestamp-based voting algorithm to arbitrate access of the servers to a set of disks, or each server reads all the other servers' disk blocks in each disk in order to determine which server has access to, and use and control of the disks at a given time.

BACKGROUND OF THE INVENTION

In many environments requiring a highly available system, disk drives need to be shared among two or more machines, such that if one machine fails, one of the others can provide access to the data stored on the shared disk drives. In such environments, it is crucial that the data on the disk drives not be accessed by multiple machines simultaneously, to prevent serious data corruption. The present invention provides for an arbitration that has fewer failure modes than previous systems for shared disk drives.

There are two areas in which the present invention is superior to the prior art in the area of disk ownership arbitration.

Typical prior art for arbitration among N servers for access to a set of disks involves a heartbeat being exchanged between two servers, and when the primary server crashes, the secondary server detects a loss of heartbeat and takes over for the failed primary. There are three weaknesses with this art that are solved by this invention.

First, the prior art typically works only with 2 servers, rather than an arbitrary number of servers.

Second, by using the disk as the communications mechanism, rather than a separate communication path, the present invention reduces the chances that the communication path used for determining which server should access the disk will fail independently from the communication path used for accessing the disk itself.

Third, even with a network partition, it is guaranteed that at most one server is granted access to the arbitrated set of disks, while most prior art has the possibility of assigning two servers access to the set of disks in the case where there is a network partition in the communications network, and both servers are actually still connected to the disks.

Another prior art device (Ubik, by Transarc Corporation [1989]), used a similar voting mechanism, run over an IP network, to elect a synchronization server for a distributed database. However, the Ubik system did not use an array of disk blocks for a communication medium, but instead used network packets exchanged over an IP network.

SUMMARY OF THE INVENTION

The present invention pertains to a data storage system. The system comprises N servers, where $N \geq 2$ and is an integer. The system comprises D disks, where $D \geq 2$ and is an integer. Each server is in communication with each disk. Each disk has a reserved disk block for each of the N servers. The system comprises a disk arbitration mechanism that uses a timestamp-based voting algorithm over the disk blocks associated with the servers to exchange votes for a primary server to arbitrate access of the servers to a set of disks.

The present invention pertains to a data storage system. The system comprises N servers, where $N \geq 2$ and is an integer. The system comprises D disks, where $D \geq 2$ and is an integer. Each server is in communication with each disk. Each disk has a reserved disk block for each of the N servers. The system comprises a disk arbitration mechanism where each of the N servers writes its state in its own associated disk block in each disk, and reads all the other servers' disk blocks in each disk in order to determine which server has access to, and use and control of the disks at a given time.

The present invention pertains to a method for storing data. The method comprises the steps of writing by N servers into each servers' own associated disk block in each disk of D disks its state, where $N \geq 2$ and $D \geq 2$ and are integers. There is the step of reading by each server all the other servers' disk blocks in each disk in order to determine which server has access to, and use and control of the disks at a given time.

BRIEF DESCRIPTION OF THE DRAWINGS

In the accompanying drawings, the preferred embodiment of the invention and preferred methods of practicing the invention are illustrated in which:

FIG. 4 shows the states that a server participating in the election protocol goes through.

DETAILED DESCRIPTION

Figure 1:
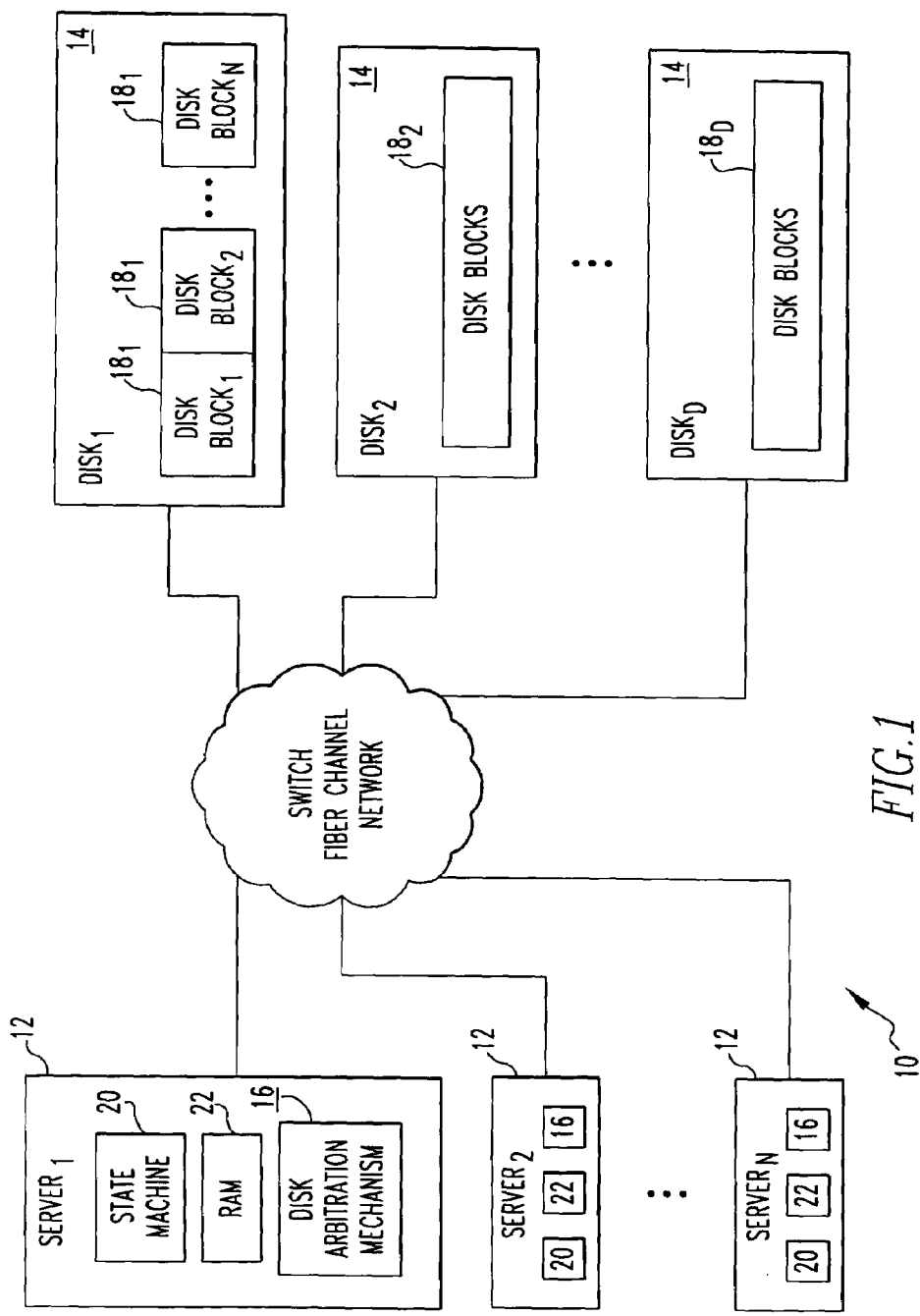
FIG. 1 is a schematic representation of a system of the present invention.

Referring now to the drawings wherein like reference numerals refer to similar or identical parts throughout the several views, and more specifically to FIG. 1 thereof, there is shown a data storage system 10. The system 10 comprises N servers 12, where $N \geq 2$ and is an integer. The system 10 comprises D disks 14, where $D \geq 2$ and is an integer. Each server 12 is in communication with each disk. Each disk has a reserved disk block 18 for each of the N servers 12. The system 10 comprises a disk arbitration mechanism 16 that uses a timestamp-based voting algorithm over the disk blocks 18 associated with the servers 12 to exchange votes for a primary server to arbitrate access of the servers 12 to a set of disks 14.

The present invention pertains to a data storage system 10, as shown in FIG. 1. The system 10 comprises N servers 12, where $N \geq 2$ and is an integer. The system 10 comprises D disks 14, where $D \geq 2$ and is an integer. Each server 12 is in communication with each disk. Each disk has a reserved disk block 18 for each of the N servers 12. The system 10 comprises a disk arbitration mechanism 16 where each of the N servers 12 writes its state in its own associated disk block 18 in each disk, and reads all the other servers' 12 disk blocks 18 in each disk in order to determine which server 12 has access to, and use and control of the disks 14 at a given time.

Preferably, each server 12 has an index. The disk arbitration mechanism 16 preferably causes each server 12 at first predetermined times to read all the disk blocks 18, and write its own disk block 18 to determine which server 12 has access to, and use and control of the disks 14 at a given time.

Preferably, each server 12 includes a state machine 20 and a local RAM 22, and maintains in local RAM 22 a last time at which each servers' 12 state's heartbeat counter changed and a value associated with the state when it last changed. Each server 12 preferably determines which of the other servers 12 are operating by identifying which of the other servers 12 had their state's heartbeat counter change during second predetermined times.

The present invention pertains to a method for storing data. The method comprises the steps of writing by N servers 12 into each servers' 12 own associated disk block 18 in each disk of D disks 14 its state, where N≧2 and D≧2 and are integers. There is the step of reading by each server 12 all the other servers' 12 disk blocks 18 in each disk in order to determine which server 12 has access to, and use and control of the disks 14 at a given time.

Preferably, the reading step includes the step of performing a voting protocol to determine which server 12 has access to, and use and control of the disks 14 at a given time. After the reading step, there are preferably the steps of determining which server 12 becomes a winning server 12 and has access to, and use and control of the disk at a given time; and accessing the disk exclusively by the winning server 12. Preferably, the accessing step includes the step of transmitting by the winning server 12 its state from not winning to winning and invalidating by the winning server 12 all caches of the winning server 12.

The writing step preferably includes the step of assigning an index to each server 12 only at initialization of the servers 12 and the disks. Preferably, the reading step includes the step of reading at predetermined times by each server 12 all disk blocks 18. The writing step preferably includes the step of writing its own respective disk block 18. The writing step preferably includes the step of maintaining by each server 12 in each servers' 12 own local RAM 22 a last time for each other server 12 when each other servers' 12 status changed and a value of a status counter at the last time.

Preferably, the reading step includes the step of determining by each server 12 which of the other servers 12 are operating by declaring that each of the other servers 12 whose status has changed within a last predetermined time period is operating. The reading step preferably includes the step of voting by the servers 12 that are up for a winning server 12 that is up and believes it is the winning server 12. Preferably, the reading step includes the step of voting for the server 12 that is up and has a lowest index if no server 12 believes it is the winning server 12.

In the operation of the invention, the system 10 is used to allow N servers 12 to share and arbitrate for access to one or more disk drives. The system 10 works by having N servers 12 perform a voting protocol, using a set of N disk blocks 18 for their communications medium. The servers 12 are all connected to the set of disks 14 for which arbitration is being performed, so that any server 12 can access all of the disks 14. In a fibrechannel switched network system, the system topology is shown in FIG. 2.

Figure 2:
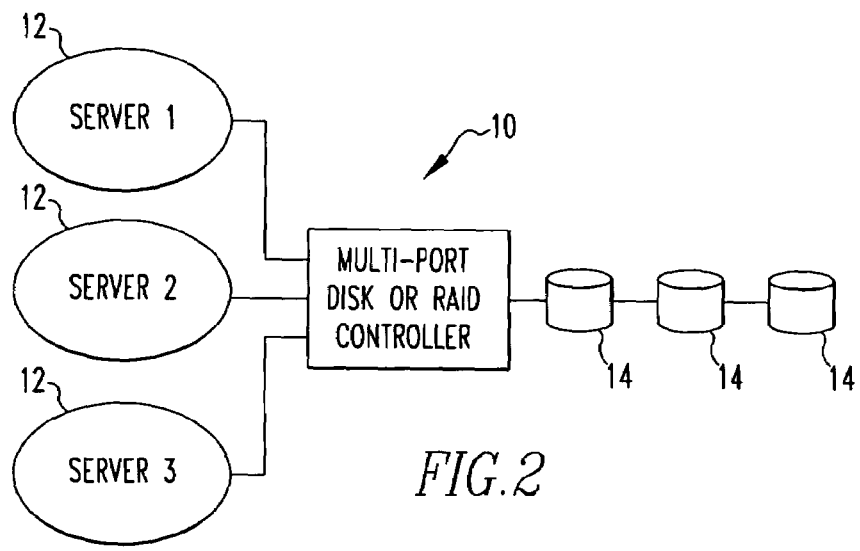
FIG. 2 is a schematic representation of the system topology.

Note that the server 12 that has won the arbitration election is clear, while the others are cross-hatched in FIG. 2, indicating that they will not attempt to access the disk drives beyond performing the reads and writes required by the voting protocol.

Note that the server that has won the arbitration election is clear, while the others are cross-hatched, indicating that they will not attempt to access the disk drives. The server that wins the election is called the primary server. Note that this is a dynamic concept, based upon the entity that wins the election, not based upon a fixed assignment.

Note that the box labeled "fibrechannel switched network" in FIG. 1 is not an arbiter, it is a simple disk controller having several access ports. The arbitration is accomplished by the voting algorithm described here, in that the winner of that election is the only server that is permitted access to the disks.

The server 12 that wins the election is given exclusive access to the relevant set of disks 14. At the time the server 12 transitions from the state of having not won an election to one of having one an election, it must invalidate all of its caches, since during the time between the last time the server 12 won an election and its winning this election, other servers 12 may have modified the contents of the disks 14 in question.

The system 10 must be used with write-through caching, so that at the time that after a server 12 crashes, the disks 14 have up-to-date data, and a newly elected server 12 can immediately take over responsibility for the set of arbitrated disks 14.

The voting protocol executed by each of the N servers 12 is now described. The system 10 described herein reserves one disk block 18 for each of the N servers 12, at a fixed location on the disk. Each of the N blocks has the following format:

```
struct voteBlock {
    uint32_t heartbeat;
    uint32_t vote;
    uint32_t PrimaryServer;
}
```

Each server 12 is also assigned a fixed index (1 . . . N) such that all servers 12 agree upon which server 12 has which index. This would typically be done when configuring the system 10. This assignment gives all servers 12 a common agreed-upon fixed ordering as determined by this index.

Each server 12 executes the same state machine 20, parameterized by the time constants theartbeat, tmin and tmax described below. Once each theartbeat seconds (typically 1 second), each server 12 reads all of the vote blocks, and writes its own vote block. There are two other constants, tmin and tmax, (again, typically 10 and 15 seconds, respectively), which will be used below.

Every time that a server writes its own vote block, it increments the heartbeat field, which is a simple counter. The server also places in the vote field the index of the server for whom it is voting; a value of 0xFFFFFFFF indicates that no vote is being cast. Finally, the amPrimaryServer field contains a 1 if the server believes that it has won the election, and 0 otherwise.

Each server 12 maintains in local RAM 22, for each other server 12, the last time at which the server's heartbeat changed, and the value of the heartbeat counter at that time. The server 12 then determines which of its peers are actually operating by declaring that any site whose heartbeat has changed during the last tMin seconds is up, and otherwise that the server 12 is down.

Figure 3:
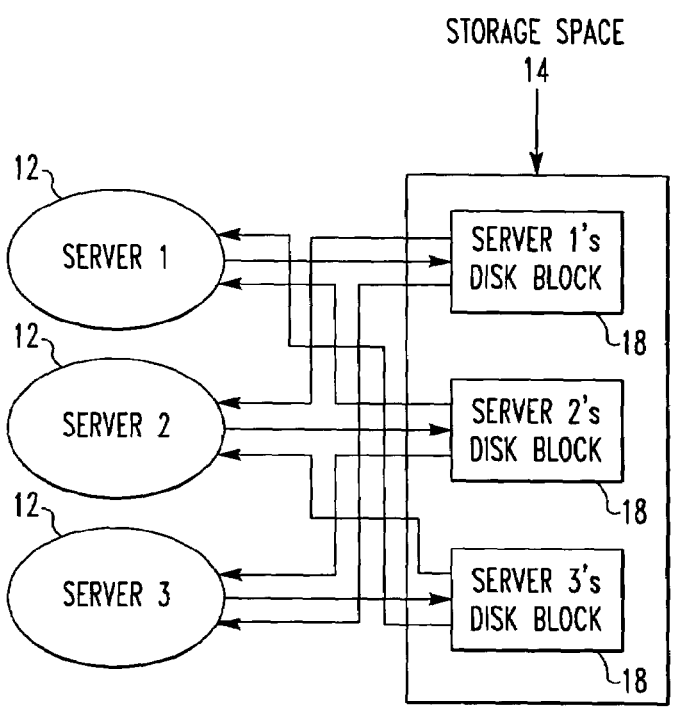
FIG. 3 is a schematic representation of the system which shows which disk blocks are written and read by which servers in a three server configuration.

FIG. 3 shows which disk blocks 18 are written and read by which servers 12 in a three server 12 configuration. An arrow from left to right indicates that the server 12 on the left writes the disk block 18 on the right, and an arrow drawn from right to left indicates that the server 12 on the left reads the disk block 18 on the right.

The server 12 determines for whom to vote based on the following algorithm. First, if a proper majority of those servers 12 that are up are voting for a server 12, and that server 12 believes that it has won the election, then the server 12 deciding how to vote casts its vote for the current election winner, to minimize disruption to the election process if servers 12 come up at varying times. Otherwise, the server 12 votes for the working server 12 with the lowest index, subject to the constraint that a server 12 can not vote for a new server 12 within tMax seconds of casting a vote for another server 12; in the interim it must vote for a null server 12 indicating that it casts no vote. If a server 12 discovers that it has a majority of votes from the set of servers 12, it sets the amPrimaryServer flag in its own record to indicate that the server 12 believes that it has won the election at least for another tMin seconds.

Under the assumptions that clock rate skew is limited to being below the fraction (tMax−tMin)/tMax, this algorithm guarantees that no two servers 12 ever simultaneously claim to win an election.

Figure 4:
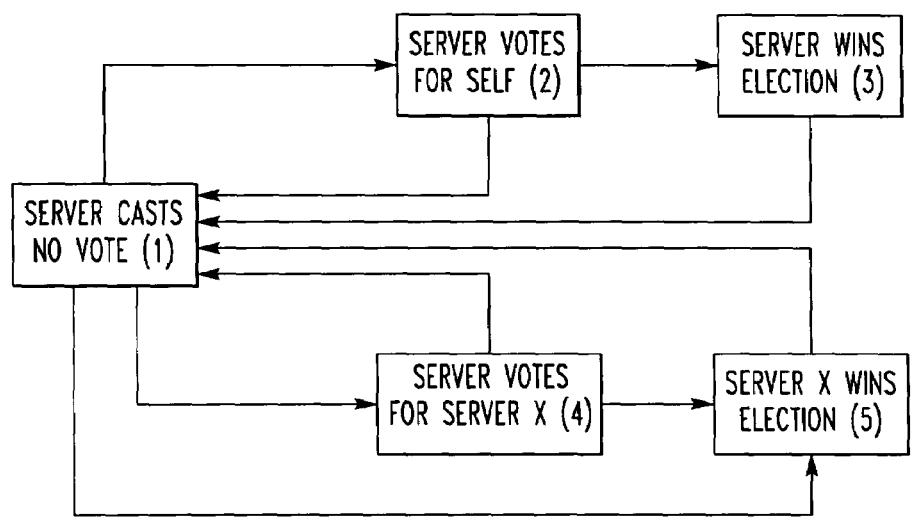

FIG. 4 shows the states that the server 12 participating in the election protocol goes through.

In this state machine 20, the transition from state 1 to state 2 occurs if the server 12 has been in state 1 for a minimum of tMax seconds, and during that time, has seen itself as the server 12 that is both functioning and has the lowest index. A transition from state 2 to state 3 occurs after a server 12 sees that it has the votes of a proper majority of the servers 12, including itself. A transition from state 1 to state 4 occurs after a minimum of tMax seconds if the server 12 sees that another server X is the server 12 that is both functioning and has the lowest index of all functioning servers 12. A transition from state 4 to state 5 occurs if the server 12 sees that server X has declared itself the winner of the election. A transition directly from state 1 to state 5 occurs if a minimum of tMax has passed and during that time server X has declared that it has won the election. A transition from state 5 to state 1 occurs if the server 12 that has declared it has won the election no longer appears up (has not updated its heartbeat field for at least tMax seconds), or no longer declares that it has won the election. A transition from state 4 to state 1 occurs if server X no longer appears up. A transition from state 2 to state 1 occurs if we have not yet won the election, and another working server 12 appears with a lower index than ours. A transition from state 3 to state 1 occurs if it sees another server 12 with a lower index decide that it has won the election (this should never happen under normal operation, and should be logged to an error manager as a significant error in the invention's implementation).

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

What is claimed is:

1. A data storage system comprising:

N servers, where N≧2 and is an integer, each server includes a state machine and a memory, and maintains in the memory a last time at which each servers' state changed and a value associated with the state when it last changed;

D disks, where D≧2 and is an integer, each server in communication with each disk, each disk having a reserved disk block for each of the N servers; and a disk arbitration mechanism that uses a timestamp-based voting algorithm over the disk blocks associated with the servers to exchange votes for a primary server, the primary server arbitrating access of the servers to a set of disks of the D disks, where a set of the disk blocks are used as a communication medium.

2. A system as described in claim 1 wherein each server has an index.

3. A system as described in claim 2 wherein the disk arbitration mechanism causes each server at first predetermined times to read all of the disk blocks, and write its own disk block to determine which server has access to, and use and control of the disks at a given time.

4. A system as described in claim 3 wherein the memory is a local RAM, and each server maintains in local RAM the last time at which each servers' state changed and the value associated with the state when it last changed.

5. A system as described in claim 4 wherein each server determines which of the other servers are operating by identifying which of the other servers had their state change during second predetermined times.

6. A method for storing data comprising the steps of:

writing by N servers into each servers' own associated disk block in each disk of D disks its state, a last time at which each servers' state changed and a value associated with the state when it last changed, where N≧2 and D≧2 and are integers; and reading by each server all the other servers' disk blocks in each disk in order to determine which server has access to, and use and control of the disks at a given time by using a timestamp-based voting algorithm over the disk blocks associated with the servers and the servers' state to exchange votes for a primary server, the primary server arbitrating access of the servers to a set of disks of the D disks, where the set of the disk blocks are used as a communication medium.

7. A method as described in claim 6 wherein the reading step includes the step of performing a voting protocol to determine which server has access to, and use and control of the disks at a given time.

8. A method as described in claim 7 including after the reading step, there are the steps of determining which server becomes a winning server and has access to, and use and control of the disk at a given time; and accessing the disk exclusively by the winning server.

9. A method as described in claim 8 wherein the accessing step includes the step of transmitting by the winning server its state from not winning to winning and invalidating by the winning server all caches of the winning server.

10. A method as described in claim 9 wherein the writing step includes the step of assigning an index to each server.

11. A method as described in claim 10 wherein the reading step includes the step of reading at predetermined times by each server all disk blocks and writing its own respective disk block.

12. A method as described in claim 11 wherein the writing step includes the step of maintaining by each server in each servers' own local RAM a last time for each other server when each other servers' status changed and a value of a status counter at the last time.

13. A method as described in claim 12 wherein the reading step includes the step of determining by each server which of the other servers are operating by declaring that each of the other servers whose status has changed within a last predetermined time period is operating.

14. A method as described in claim 13 wherein the reading step includes the step of voting by the servers that are up for a winning server that is up and believes it is the winning server.

15. A method as described in claim 14 wherein the reading step includes the step of voting for the server that is up and has a lowest index if no server believes it is the winning server.

16. A method as described in claim 15 including the step of transitioning in the state machine from state 1 to state 2 if the server has been in state 1 for a minimum of tMax seconds, and during that time, has seen itself as the server that is both functioning and has the lowest index.

17. A method as described in claim 16 including the step of transitioning in the state machine from state 2 to state 3 after a server sees that it has the votes of a proper majority of the servers, including itself.

18. A method as described in claim 17 including the step of transitioning in the state machine from state 1 to state 4 after a minimum of tMax seconds if the server sees that another server is the server that is both functioning and has the lowest index of all functioning servers.

19. A method as described in claim 18 including the step of transitioning in the state machine from state 4 to state 5 occurs if the server sees that the other server has declared itself the winner of the election.

20. A method as described in claim 19 including the step of transitioning in the state machine directly from state 1 to state 5 if a minimum of tMax has passed and during that time, the other server has declared that it has won the election; from state 5 to state 1 occurs if the server that has declared it has won the election no longer appears functioning, or no longer declares that it has won the election; from state 4 to state 1 if the server no longer appears functioning; from state 2 to state 1 occurs if the server has not yet won the election, and the other server appears with a lower index that the server; from state 3 to state 1 occurs if it sees the other server with a lower index decide that it has won the election.

21. A method for storing data comprising the steps of:
writing by N of servers into each servers' own associated disk block in each disk of D disks its state, where N≧2 and D≧2 and are integers; and
reading by each server all the other servers' disk blocks in each disk in order to determine which server has access to, and use and control of the disks at a given time;
determining which server becomes a winning server and has access to, and use and control of the disk at a given time;
accessing the disk exclusively by the winning server; and
transmitting by the winning server its state from not winning to winning and invalidating by the winning server all caches of the winning server.

22. A method as described in claim 21 wherein the writing step includes the step of assigning an index to each server.

23. A method as described in claim 22 wherein the reading step includes the step of reading at predetermined times by each server all disk blocks and writing its own respective disk block.

24. A method as described in claim 23 wherein the writing step includes the step of maintaining by each server in each servers' own local RAM a last time for each other server when each other servers' status changed and a value of a status counter at the last time.

25. A method as described in claim 24 wherein the reading step includes the step of determining by each server which of the other servers are operating by declaring that each of the other servers whose status has changed within a last predetermined time period is operating.

26. A method as described in claim 25 wherein the reading step includes the step of voting by the servers that are up for a winning server that is up and believes it is the winning server.

27. A method as described in claim 26 wherein the reading step includes the step of voting for the server that is up and has a lowest index if no server believes it is the winning server.

28. A data storage system comprising:
N servers, where N≧2 and is an integer, each server has an index, each server includes a state machine and a local RAM, and maintains in local RAM a last time at which each servers' state changed and a value associated with the state when it last changed; D disks, where D≧2 and is an integer, each server in communication with each disk, each disk having a reserved disk block for each of the N servers; and
a disk arbitration mechanism where each of the N servers writes its state in its own associated disk block in each disk, and reads all the other servers' disk blocks in each disk in order to determine which server has access to, and use and control of the disks at a given time, the disk arbitration mechanism causes each server at first predetermined times to read all of the disk blocks, and write its own disk block to determine which server has access to, and use and control of the disks at a given time.

29. A system as described in claim 28 wherein each server determines which of the other servers are operating by identifying which of the other servers had their state change during second predetermined times.

30. A system as described in claim 5 wherein in the state machine, a transition from state 1 to state 2 occurs if the server has been in state 1 for a minimum of tMax seconds, and during that time, has seen itself as the server that is both functioning and has the lowest index of the functioning servers.

31. A system as described in claim 30 wherein in the state machine, a transition from state 2 to state 3 occurs after the server sees that it has the votes of a proper majority of the servers, including itself.

32. A system as described in claim 31 wherein in the state machine, a transition from state 1 to state 4 occurs after a minimum of tMax seconds if the server sees that another server is the server that is both functioning and has the lowest index of all functioning servers.

33. A system as described in claim 32 wherein in the state machine, a transition from state 4 to state 5 occurs if the server sees that the other server has declared itself the winner of the election.

34. A system as described in claim 33 wherein in the state machine, a transition directly from state 1 to state 5 occurs if a minimum of tMax has passed and during that time, the other server has declared that it has won the election; a transition from state 5 to state 1 occurs if the server that has declared it has won the election is no longer functioning, or no longer declares that it has won the election; a transition from state 4 to state 1 occurs if the other server no longer appears functioning; a transition from state 2 to state 1 occurs if the server has not yet won the election, and the other server appears with a lower index than the server; a transition from state 3 to state 1 occurs if the server sees the other server with a lower index decide that the other server has won the election.

* * * * *